United States Patent [19]
Thioliere

[11] Patent Number: 5,785,783
[45] Date of Patent: Jul. 28, 1998

[54] DEVICE FOR QUICKLY FITTING SNOW CHAINS TO VEHICLE TIRES

[76] Inventor: Georges Thioliere, 18, rue Joseph-Serlin, Lyon, France, 69001

[21] Appl. No.: 704,753
[22] PCT Filed: Mar. 24, 1995
[86] PCT No.: PCT/FR95/00364
 § 371 Date: Sep. 24, 1996
 § 102(e) Date: Sep. 24, 1996
[87] PCT Pub. No.: WO95/25643
 PCT Pub. Date: Sep. 28, 1995

[30] Foreign Application Priority Data

Mar. 24, 1994 [FR] France ............... 94 03726

[51] Int. Cl.⁶ ............................................. B60C 27/12
[52] U.S. Cl. .................... 152/216; 152/218; 152/223; 152/241
[58] Field of Search ................ 152/225 R, 216, 152/218, 223, 241, 213 R, 213 A

[56] References Cited

U.S. PATENT DOCUMENTS

| 2,655,972 | 10/1953 | Doney | 152/213 |
| 2,806,503 | 9/1957 | Hamerski | 152/225 R |
| 3,242,963 | 3/1966 | Rietveld | 152/213 |
| 3,896,687 | 7/1975 | Cloud | 152/216 |
| 3,965,956 | 6/1976 | Whatley, Jr. | 152/213 R |
| 4,321,956 | 3/1982 | Martinelli | 152/221 X |
| 4,334,569 | 6/1982 | Jacob et al. | 152/221 |

FOREIGN PATENT DOCUMENTS

| 0226571 | 6/1987 | European Pat. Off. |
| 0298906 | 1/1989 | European Pat. Off. |
| 0312636 | 4/1989 | European Pat. Off. |
| 2630972 | 11/1989 | France . |
| 556251 | 11/1974 | Switzerland . |

*Primary Examiner*—Francis J. Lorin
*Attorney, Agent, or Firm*—Greenblum & Bernstein P.L.C.

[57] ABSTRACT

A tire chain assembly including two stays hinged at one end on a housing and supporting wall chains which hold tread chains in place on the tread of the tire when they are pulled tight as the stays are drawn together by a resilient linkage. Arms or resilient linkages control displacement and vibration of the stays when the wheel is moving. The device enables gripping equipment to be fitted quickly and easily and is suitable for use on snow-covered, muddy, sandy, or vegetation-covered terrain.

9 Claims, 3 Drawing Sheets

DEVICE FOR QUICKLY FITTING SNOW CHAINS TO VEHICLE TIRES

BACKGROUND OF THE INVENTION

1. Field of the Invention

The present invention relates to an improved device for installing snow chains on road vehicle tires.

2. Description of Background and Relevant Information

When the road is covered with snow, vehicle tires run the risk of skidding, which causes the driver to lose control of the vehicle. To prevent or limit the risks of skidding, tires have been provided with studs or tire treads comprising a very particular size and/or a tread rubber of very particular design; this technique is very efficient but requires a set of special tires for winter, because these tires cannot be used in summer and, in addition, they are inefficient on deep fresh snow.

For occasional users, and those who may find themselves in heavy snow, commercially available devices include chains or notched bars for insertion between the tire and the snow. These devices include protuberances that become anchored in the snow, on the one hand, and the tire becomes attached to such protuberances, on the other hand.

When the chains, which will be referred to hereinafter as "crosspieces" 1, as seen in FIG. 1, are used, they are substantially perpendicular to the tread 26 of the tire 18 such that they are each located in a plane passing through the axis of rotation of the wheel 27, and are position at regular intervals, if possible. The length of each crosspiece 1 is generally greater than the width 28 of the tire tread 26, and each of its ends 29 is connected on both sides of the tire 18, at the end 29 of the other crosspieces 1, by a connecting chain 8 referred to hereinafter as a "wall chain"; there is an outer wall chain 31 and an inner wall chain positioned on the other side 30 of the wheel 27 (seen in FIG. 2), i.e., on the side where the hub of the wheel 27 is attached.

When the assembly is placed on the ground such that the crosspieces 1 (FIG. 1) and the wall chains 8 are straight, one obtains a kind of ladder whose wall chains 8 form the side pieces, and the crosspieces 1, which generally have the same length, form the rungs. The assembly is wound around the tire 18 of the wheel 27 such that the crosspieces 1 are positioned on the tire tread 26, the middle of the crosspiece 1 coinciding substantially with the median of the tire tread 26. With the assembly placed on the tire in this manner, the wall chains 8, whose maximum length is about 15–20% less than the outer perimeter of the tire 18, are stretched. The crosspieces 1 are positioned by degrees such that they are located substantially in planes passing through the axis of the wheel 27, and the two ends 4 and 5 of each wall chain 8 are fastened by an appropriate device by adjusting the chain to a suitable length so that it is stretched. French Patent Publication No. 2 630 972 discloses a snow chain of this type.

In practice, it is difficult to have access to the rear portion 30 (FIG. 2) of the wheel 27, located on the side of the hub attachment point, to fasten the wall chain. If the assembly is positioned so as to first cover the upper portion of the wheel, the attachment zone of the ends 4 and 5 of the wall chains 8 is located next to the ground. The length for contact of the tire tread 26 with the ground, in this area, by construction being greater than the distance between two crosspieces 1 in succession, it is impossible to correctly fasten the ends 4 and 5 of the wall chain 8, it is accordingly recommended, at that time, to position the snow chain flat as previously described to allow the car to ride thereon, and to then proceed with the closure of the wall chains 8. Placing the assembly on the tire by this procedure requires that numerous operations be carried out in a predetermined order. Moreover, preliminary training is necessary to perform this operation correctly.

To simplify the positioning of the anti-skid device on the tires, the crosspieces have been replaced in other applications by notched rungs placed perpendicularly to the tire tread and connected to rods that are substantially perpendicular to the bars and oriented substantially towards the center of the wheel. The rods are connected to one another, in the vicinity of the wheel, by an element comprising a mechanism that makes it possible to adjust the length of the rods such that the bar assembly is tightened on the tire. At that time, it is no longer necessary to have access to the rear of the wheel to position the device. This type of assembly, which provides an elegant technical solution to the problem, has the disadvantage of being mechanically more complex and, therefore, more expensive. Further, it had to be abandoned because it was damaging the suspension and the transmission on the vehicles.

There is a derived system, according to the device disclosed in European Patent Publication No. 0 312 636, that enables the attachment of the chains. This system comprises notched rungs attached to two wall chains, which themselves are attached at four points located on the tire tread. The wall chains are inserted at the same time as the rungs between the tread and the ground. The four attachment points are connected by a device journalled to arms forming substantially a cross centered on the wheel axis; the connecting element maintaining the arms is fastened to the wheel rim by means of elastic attachments, with respect to which the connecting element can pivot about an axis parallel to the wheel axis to enable the attachment points of the chains to rotate with respect to the elastic attachment. This device has the disadvantage of being delicate to position on the wheel. U.S. Pat. No. 3,242,963 discloses a snow chain comprising crosspieces maintained in place on the tire tread by wall chains. These chains are stretched by means of stays associated with one arm, the tensioning being ensured by an air jack that tends to bring said stays closer together.

SUMMARY OF THE INVENTION

The present invention has an object of proposing a nonskid device that has the advantage of being simple, and easy to mount on the tire without particularly displacing the car. In particular, it enables the centering and the tensioning of the assembly in a single movement.

The present invention is accordingly a chain assembly for vehicle wheels. Preferably, the chain assembly is a snow chain assembly.

The chain assembly of the present invention comprises a plurality of driving surface-contacting members to be maintained on tire tread. Preferably, the driving surface-contacting members are crosspieces.

The chain assembly of the present invention further comprises a wall chain subassembly. The wall chain subassembly comprises an inner wall chain to be positioned on the side of the wheel opposite to that taken by the individual installing the chain assembly, and an outer wall chain to be positioned on the same side of the wheel as that taken by the individual installing the tire chain, The chain assembly of the invention further comprises two L-shaped stays for tensioning the wall chain subassembly on both sides of the wheel. Each of the two L-shaped stays comprises both a horizontal portion of the L-shape, to which the wall chain subassembly is directly or indirectly fixed, and also a vertical portion of the L-shape, which comprises a hooking or attachment point.

The chain assembly of the invention further comprises a common connection element on which each of the two L-shaped stays is journalled, by its vertical portion of the L-shape, about a separate axis of rotation. When the chain assembly is assembled on the vehicle wheel, the common connection element is located in the vicinity of the wheel axis on the same side of the wheel as the outer chain.

The chain assembly of the invention further comprises a first elastic link for tensioning the chain assembly when the chain assembly is assembled on the vehicle wheel. The first elastic link comprises ends to be fixed to the L-shaped stays at the attachment points.

The chain assembly of the invention further comprises at least two arms, each of which is fixed at one end to the outer wall chain, and also journalled at the other end on the common connection element, by a separate axis of rotation. The axes of rotation for the at least two arms are substantially parallel to the axes of rotation for the two L-shaped stays.

The chain assembly of the invention further comprises at least one second elastic link. The at least one elastic link comprises three attachment points for connecting between the two L-shaped stays, and also between the outer wall chain and the two L-shaped stays. The first attachment point is for attachment to the outer wall chain, and is located in the bisecting plane of the angle formed by the two L-shaped stays, when the chain assembly is assembled on the wheel. Each of the second and third attachment points is connectable to the vertical portion of the L-shape of an L-shaped stay.

BRIEF DESCRIPTION OF HE DRAWINGS

DETAILED DESCRIPTION OF THE EMBODIMENTS

Figure 1:
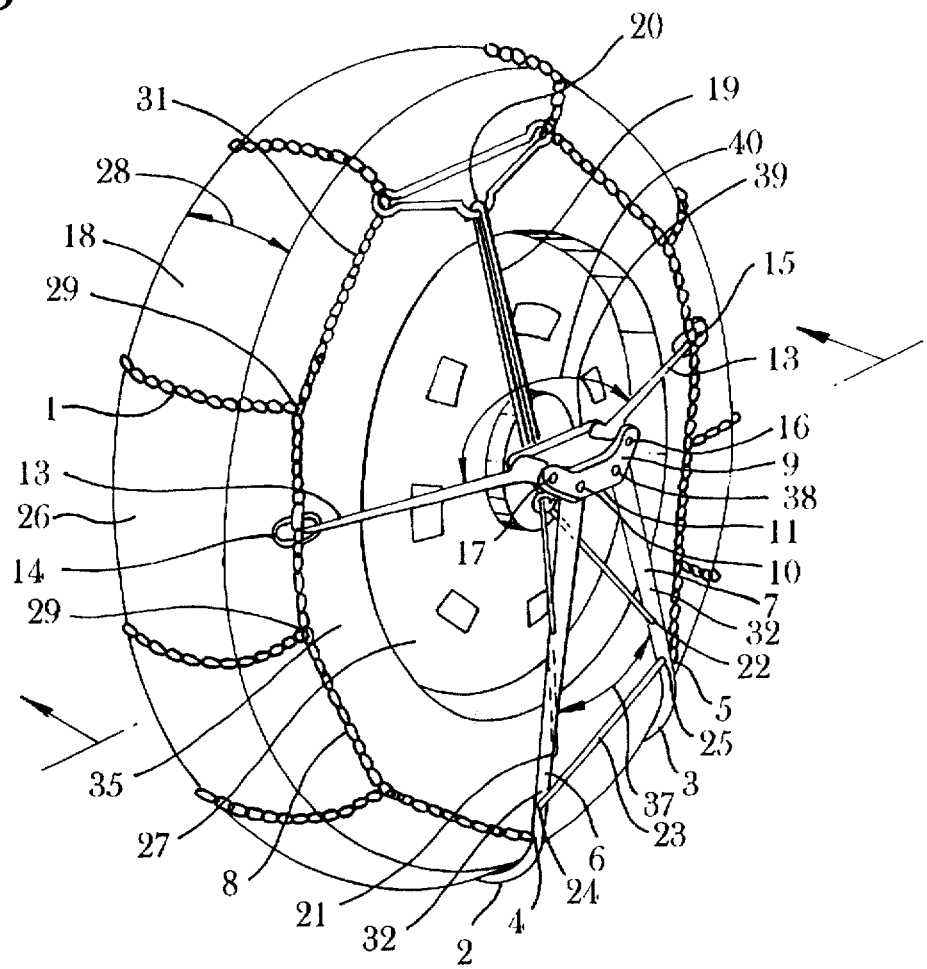
FIG. 1 shows a perspective view of the device for tensioning the chains according to the invention, seen from the outer side of the wheel in the operating position.

The invention resides in a device for tensioning the previously described wall chains 8, shown in FIG. 1, especially when they are associated with crosspieces 1; but the device is also suitable where the crosspieces 1 are replaced by known systems that are more complex, such as those that use a crossed arrangement of chains for insertion between the tire 18 and the ground or a frame, without these examples being limiting. For clarity of the disclosure, only the example using crosspieces 1 will be considered, it being understood that all of the systems susceptible of being attached by wall chains 8 fall within the scope of this invention.

The device for tensioning the wall chains 8 (FIG. 1) is constituted by two "L"-shaped stays 32. The portion 6 and 7 of each stay corresponding to the vertical portion of the "L" has a length on the order of the radius of the tread 26 of the tire 18; the top of the "L" of each portion 6 and 7 of the stay 32 is journalled on a connecting piece 11 that is referred to hereinafter as the housing 11.

The housing is mainly formed of two parallel flanges 38 and 39 crossed by the journal axes of the stays 32; the stays 32 are journalled on the housing 11, respectively, along an axis 10 and an axis 9 that are parallel to the axis 34 (FIG. 2) of the wheel 27, when the snow chain (FIG. 1) is in place on the wheel. Housing 11 enables a movement of the stays 32 about their respective axes 9 and 10 from a position where they are parallel and side by side to a position in which the stays 32 (FIG. 2) are preferably in the extension of one another.

Figure 2:
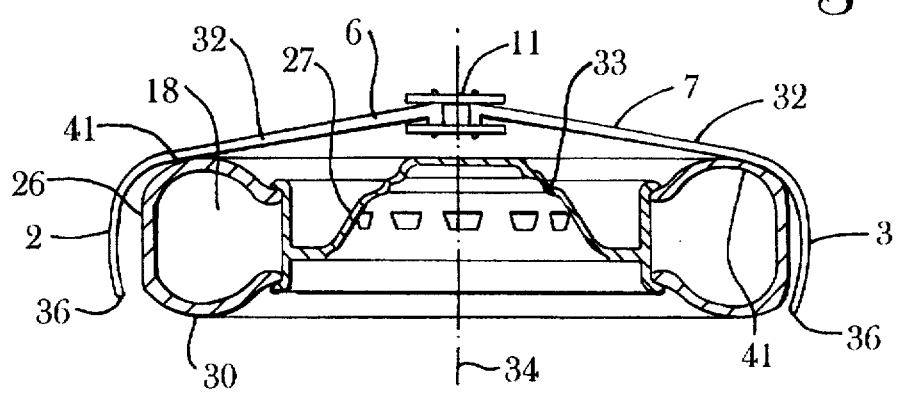
FIG. 2 shows a cross-section along a plane passing through the wheel axis of rotation and showing the tensioning device in the position which it takes during mounting on the wheel, the chains not being shown.
Figure 3:
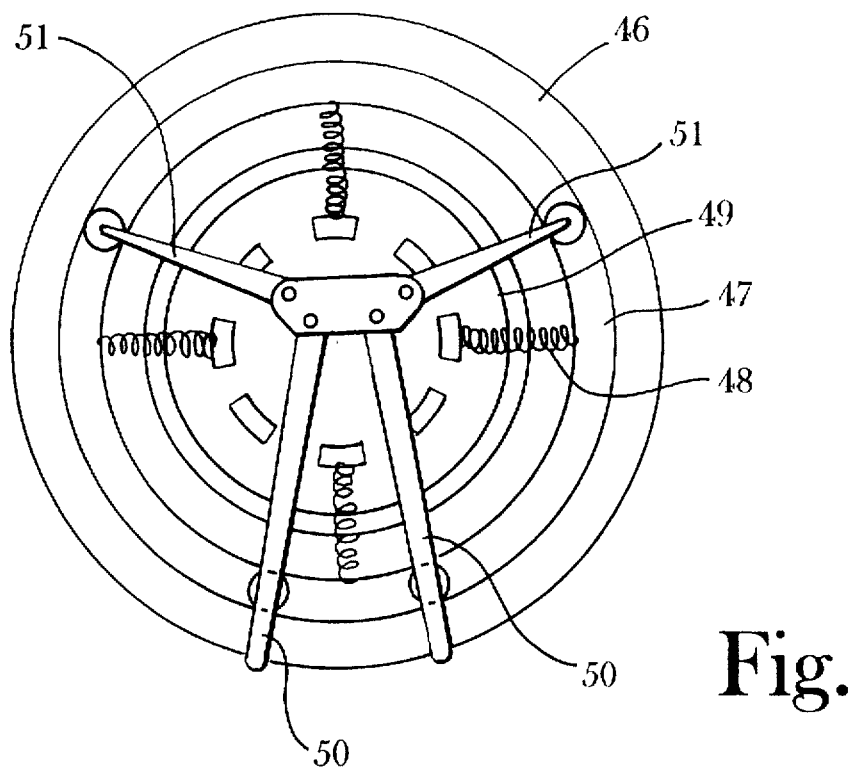
FIG. 3 shows a wheel provided with a magnetic collar flat makes it possible to hold in place the tension device according to the invention during the assembly. The chains are not shown.
Figure 4:
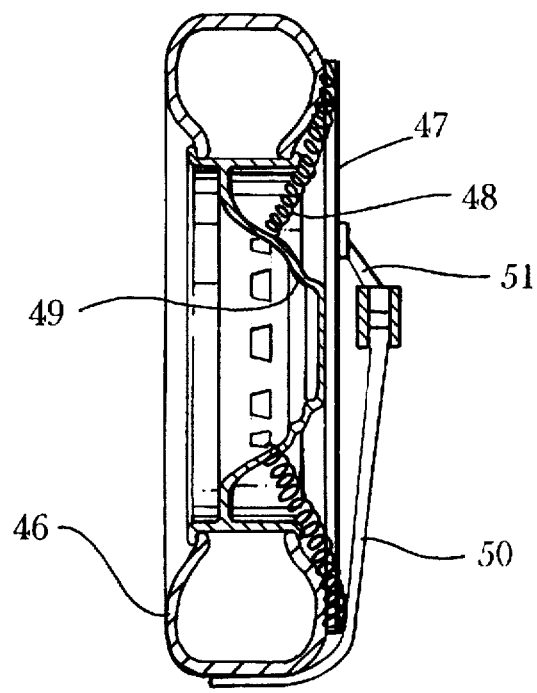
FIG. 4 shows a cross-section of the device of FIG. 3 with the aligned stays, the chains not being shown.
Figure 5:
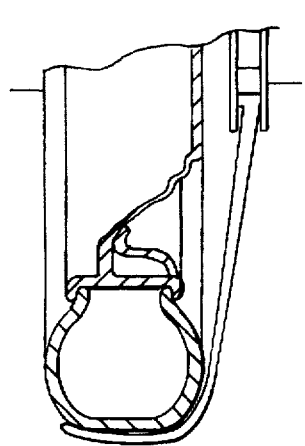
FIGS. 5, 6, 7, 8 and 9 show various forms of stays.
Figure 6:
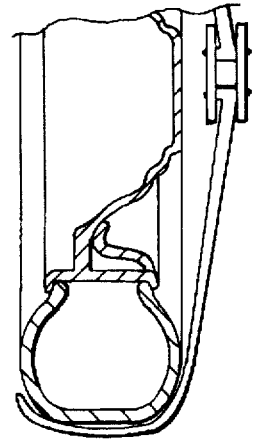
Figure 7:
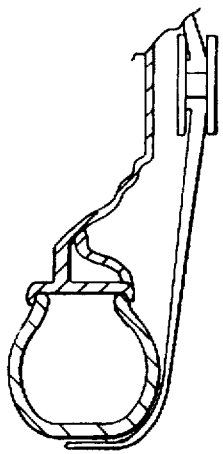

Of course, the portion 6 and 7 of each stay 32 corresponding to the vertical portion of the "L" has a shape that makes it possible to move the housing 11 away from the center of the rim 33 of the wheel 27 over a sufficient distance so that it is not disturbed by the shape of the latter 33 when the tensioning device is positioned. The portion 2 and 3 of each stay corresponding to the horizontal portion of the "L" is substantially parallel to the axis 34 of the wheel 27, when the tensioning device is positioned, and is pressed across the tread 26 of the tire 18, the shape of which it assumes substantially; its length is determined as a function of the width of the tire and can vary as indicated in FIG. 5, FIG. 6 and FIG. 7. In the preferred version of the invention, the length is such that the end of the stays does not stick out of the tire 18 on the inner side of the wheel, as indicated in FIG. 5 or FIG. 7. When the stays 32 rotate about journals 9 and 10, their ends 2 and 3 corresponding to the horizontal portion of the "L" remain parallel, and their maximum spacing during the movement must be greater than the outer diameter of the tire 18, as shown in FIG. 2.

The ends 4 and 5 of the outer wall chain 31 are permanently fixed on the portions 6 and 7 of the stays 32 Each of the ends of the inner wall chains located on the side 30 (FIG. 2) of the wheel 27, is permanently fixed in the vicinity of the end 36 of the corresponding stay 32, i.e., in the vicinity of the end 36 of the horizontal portion of the "L".

The tensioning of the wall chains 8 (FIG. 1) is done by bringing the stays 32 closer together, under the action of springs or rubber bands 23 stretched between the two stays 32, between attachment points 24 and 25 located in the zones 6 and 7 of the stays 32, so that there is a tendency to close the angle 37 that they create between them. Since the wall chains 8 are stretched, the crosspieces are stretched as described previously.

During operation, the deformations of the tire 18 cause the stays 32 to oscillate in a plane parallel to the axis of rotation 34 (FIG. 2) of the wheel 27, and it is necessary to limit the movement thereof with respect to the rim 33. In a preferred version of the invention, the casing 11 (FIG. 1) comprises two arms 12 and 13 journalled, at one of their ends, in the casing 11 along axes 16 and 17 substantially parallel to those 9 and 10 of the stays 32, but positioned so as not to hinder the movement of the latter about their respective axes 9 and 10. The arms 12 and 13 are fixed to the outer wall chain 31 in the vicinity of ends 14 and 15, respectively, such that when the snow chain is positioned, they form, between them, an angle 40 greater than 120 degrees, open on the side opposite the opening of the angle 37 of the two stays 32 while having substantially the same bisector. When the outer wall chain 31 is stretched by the coming together of the stays 32, it constitutes a relatively fixed point for supporting the arm, which makes it possible to create a sort of triangle that allows the movement of the casing 11 to be limited.

During operation, the casing 11 (FIG. 1) makes it possible to partially separate tie relative movements of the stays 32 under the action of the irregularities of the road and the deformation of the tire 18. Indeed, the stays 32 are displaced in a substantially radial direction with respect to the wheel 27, whereas the casing 11 oscillates about an axis of rotation, remaining substantially parallel to itself and to the axis 34 (FIG. 2) of the wheel 27, so as to compensate for the relative displacements of the two stays 32 (FIG. 1). This oscillation causes the displacement of the journal points of the arm 12 and 13 in a direction perpendicular to the general direction of the arms, which makes it possible to considerably limit the force on tie attachment of the ends 14 and 15, respectively, on the wall chain 31. In a preferred version of the invention, each of the ends 14 and 15 of the arms 12 and 13, fixed to the wall chain 31, comprises a flat support zone on the tire 18.

The axes 16 and 17 of the arms 12 and 13 are preferably positioned on both Is sides of the axes of rotation 9 and 10 of the stays 32 so as not to hinder the movement of the stays 32 and to facilitate the folding of the snow chain when it is not in use. When the stays 32 are positioned parallel side-by-side, the arms 12 and 13 can then be brought back parallel to the stays 32 so that the assembly takes the least possible volume.

The position of the arms 12 and 13 journalled by forming an angle 40 greater than 120° does not permit efficient dampening of the oscillations due to the radial displacement of them stays 32, under action of the centrifugal forces and of the irregularities of the road. To prevent this phenomenon, there can be placed, in the bisecting plane of the angle 37 formed by the stays 32, an elastic connection 19 connecting the stays 32. Elastic connection 19 is fixed to stays 32 at points 21 and 22 of zones 6 and 7, and is fixed to the wall chain 31 in the area 20 where it cuts such bisecting plane.

If necessary, there can be added other arms for maintaining the casing 11 and other flexible connections, elastic or not, between the stays 32 and the outer wall chain 31 without leaving the scope of the invention.

The positioning of the snow chain is done in the following manner: the chain is positioned flat on the ground such that the portions 2 and 3 (FIGS. 1, 2) of the stays 32, corresponding to the horizontal portion of the "L" are turned upwardly, and such that the stays 32 are substantially opposed and positioned parallel to the plane of the wheel 27 on which the chain must be placed. All of the wall chains 8, crosspieces 1, and arms 12 and 13 are located on the side of the stays 32 opposite the wheel 27. The inner wall chain is grasped at a right angle to the attachment point 20 on the outer wall chain 31, of the elastic link 19 previously described to be located in the bisecting plane, and it is passed behind the upper portion of the tire 18. During this movement, the housing 11 is placed in the vicinity of the axis 34 (FIG. 2) of the wheel 27 and the stays 32 that are in the extension of one another come to cover the tire 18 through their ends 2 and 3 corresponding to the horizontal portion of the "L", whereas the portions 6 and 7 corresponding to the vertical portion of the "L" come into contact with 41 with the tire 18. The stays 32 (FIG. 1) are lowered towards one another under their own weights by pivoting about their respective axes 9 and 10, whereas the crosspieces 1 are correctly positioned with respect to their attachment points 29 corresponding on the wall chains 8. When everything is positioned, the stays 32 are affixed to one another by means of a stretched elastic link 23 that makes it possible to simultaneously stretch the crosspieces 1; the snow chain is then in position.

In the preferred version of the application, the arms 12 and 13 position themselves when the stays 32 pivot to be positioned while the elastic link 19 located in the bisecting plane is stretched. It is necessary to increase the tension of the elastic link 23 between the stays 32, to consider the act that the stays will be completely positioned as soon as the vehicle will pull up, in order to maintain a still sufficient tension, because the distance between them is, by construction, less than the length of the support zone of the tire on the road.

To dismount the snow chain, it suffices to preferably place the wheel 27 in a position such that the stays 32 are not wedged between the tire tread 26 and the grounds to untie the elastic link 23 which brings the two stays 32 closer together, and to space the two stays 32 apart by pulling towards oneself so that the inner wall chain passes again above the tire tread 26 to come on the outer side; the pulling is continued until there only remains the internal portion of the chain confined by the contact of the tire tread 26 with the ground. It suffices to move the vehicle forward to release the chain. It is still necessary to fold it by bringing the stays 32 and, in the preferred version, the arms 12 and 13 such that they are positioned in parallel to one another to occupy a minimum space.

In another variation of the invention, the arms 12 and 13 are replaced by the extension of one of the stays 32 beyond its axis of rotation 9 with respect to the housing which remains substantially at the level of the center of the wheel. This extension reaches up to the chain 31, to which the end of the stay extension is fixed.

In a variation of the device, a non-elastic link 45, by sliding along the stays 42 which it encircles, and which are progressively spaced apart, makes it possible to perform the tensioning of the chains by playing on their flexibility.

In a variation of the invention, there can be attached, against the outer side of the tire 46, a magnetic ring 47 fixed by springs 48 to the rim 49 of the wheel. The stays 50 and possibly the arms 51 are pressed against the magnetic ring 47 and maintained in place by magnetic attraction at the time of installation. The positioning of these elements is thereby facilitated, and also their vibrations during movement are eliminated.

Figure 8:
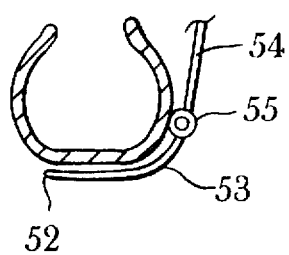
Figure 9:
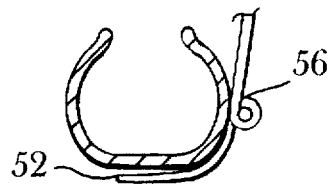

In another variation of the invention, the end 52 (FIG. 8) of the stays 53, corresponding to the horizontal portion of the "L", is connected to the other portion 54 of the stay 53, by a journal 55 along an axis perpendicular to the general direction of the portion 54 of the stay 53 and to the journal axis of the portion 54 on the housing. Alternatively, in this variation the end 52 is connected to portion 54 by an elastically deformable device 56 (FIG. 9) by pivoting about an axis parallel to the direction of the axis 55 (FIG. 8) which has just been described. All of these devices having the object of dampening the stress peaks to which the end 52 of the stays, pinched between the ground and the tire tread, is subjected.

Figure 10:
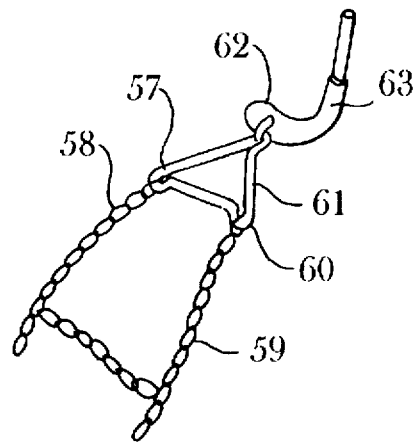
FIG. 10 shows a variation of the hooking mode of the wall chains on the stays.
Figure 11:
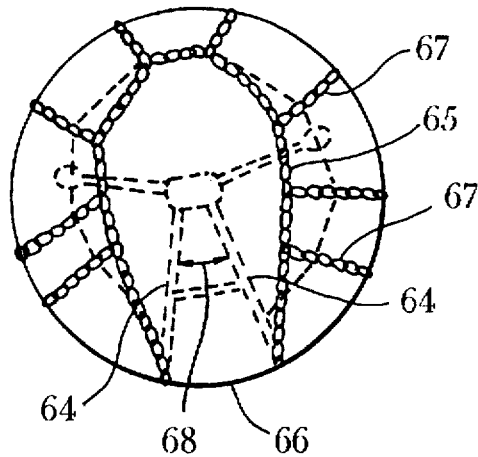
FIG. 11 shows the inner wall chain having a particular profile when it is stretched.

In another variation of the invention, the ends 57 and 60 (FIG. 10) of the corresponding wall chains 58 and 59 are fixed to a rigid stirrup 61. In turn, rigid stirrup 61 is fixed at a single point 62 of the corresponding stay 63 located in the middle of the tire tread, when the snow chain is in place.

In another version of the invention, the grip of the inner wall chain 65 is sought to be improved. In this version, the crosspieces 67 are lengthened sufficiently so that the inner wall chain 65 assumes a substantially elliptical form, the major axis of which is parallel to the bisecting plane of the angle 68 formed by the stays 64 when it is in place.

As specified at the beginning of the description, all the other devices for insertion between the tire treads that are compatible with the use of the wall chains fall within the scope of the invention.

When the diameter of the wheels and/or the width of the tires change within reasonable margins, the adjustment of the dimensions occurs naturally through a variation of the angle 37 (FIG. 1) of the stays 32 and of the angle 40 of the maintaining arms 12 and 13. The same tensioning assembly can be mounted with different lengths for the wall chains.

The present device, including all of its variations, is also suitable for surfaces, particularly driving surfaces other than snow, such as mud, sand, and vegetation-covered grounds.

We claim:

1. A chain assembly for vehicle wheels, comprising:
   (a) a plurality of driving surface-contacting members to be maintained on tire tread;
   (b) a wall chain subassembly for maintaining the plurality of driving surface-contacting members on the tire tread, this subassembly comprising:
      (i) an inner wall chain, to be positioned on the side of the wheel opposite to that taken by the individual installing the chain assembly; and
      (ii) an outer wall chain, to be positioned on the same side of the wheel as that taken by the individual installing the chain assembly;
   (c) two L-shaped stays for tensioning the wall chain subassembly on both sides of the wheel, each of the two L-shaped stays comprising:
      (i) a horizontal portion of the L-shape, to which the wall chain subassembly is directly or indirectly fixed; and
      (ii) a vertical portion of the L-shape, comprising a hooking point;
   (d) a common connection element on which each of the two L-shaped stays is journalled, by a respective vertical portion of the L-shape, about a separate axis of rotation, the common connection element to be located, when the chain assembly is assembled on the vehicle wheel, in the vicinity of the wheel axis on the same side of the wheel as the outer wall chain;
   (e) a first elastic link for tensioning the chain assembly when the chain assembly is assembled on the vehicle wheel, the first elastic link comprising ends to be fixed to the L-shaped stays at the hooking points;
   (f) at least two arms, each fixed at one end to the outer wall chain, and at the other end each journalled on the common connection element about a separate axis of rotation, the axes of rotation for the at least two arms being substantially parallel to the axes of rotation for the two L-shaped stays;
   (g) at least one second elastic link comprising three attachment points for connecting between the two L-shaped stays and between the outer wall chain and the two L-shaped stays:
      (i) the first attachment point, for attachment to the outer wall chain, being located in the bisecting plane of the angle formed by the two L-shaped stays, when the chain assembly is assembled on the wheel; and
      (ii) each of the second and third attachment points being connectable to the vertical portions of the L-shape of an L-shaped stay.

2. The chain assembly according to claim 1, comprising a snow chain assembly.

3. The chain assembly according to claim 1, wherein the driving surface-contacting members comprise crosspieces.

4. The chain assembly according to claim 1, wherein the inner wall chain is hooked by respective ends to the ends of the horizontal portions of the L-shapes of the L-shaped stays.

5. The chain assembly according to claim 1, wherein corresponding ends of the inner wall chain and the outer wall chain are fastened at a single point of their corresponding stay by a stirrup.

6. The chain assembly according to claim 1, further comprising:
   (a) a magnetic ring to be associated with the outer side of the tire, and oil which the L-shaped stays are to be pressed by magnetic attraction; and
   (b) a plurality of elastic links for fixing the magnetic ring to the wheel rim.

7. The chain assembly according to claim 6, wherein the at least two arms are to be pressed on the magnetic ring by magnetic attraction.

8. The chain assembly according to claim 1, wherein, for the L-shaped stays, the horizontal and vertical portions of the L-shape are journalled by an elastic connection, thereby enabling the horizontal and vertical portions to oscillate with respect to one another while remaining in the plane of the L-shape of the stay.

9. The chain assembly according to claim 1, wherein the length of the driving surface-contacting members enables the inner wall chain and the outer wall chain, when tensioned, to assume a substantially elliptical profile having its major axis located in the bisecting plane of the angle formed by the L-shaped stays.

* * * * *